United States Patent [19]
Kamata

[11] Patent Number: 5,883,742
[45] Date of Patent: Mar. 16, 1999

[54] IMAGE VIBRATION REDUCTION DEVICE

[75] Inventor: Tetsuji Kamata, Kawasaki, Japan

[73] Assignee: Nikon Corporation, Tokyo, Japan

[21] Appl. No.: 712,648

[22] Filed: Sep. 11, 1996

[30] Foreign Application Priority Data

Sep. 13, 1995 [JP] Japan ................................ 7-235031

[51] Int. Cl.$^6$ ............................ G02B 27/64; G03B 17/00
[52] U.S. Cl. ............................ 359/557; 359/554; 396/55
[58] Field of Search ................................ 359/554–557, 359/813–814, 823–824; 396/52–55, 421; 348/207–208

[56] References Cited

U.S. PATENT DOCUMENTS

| | | | |
|---|---|---|---|
| 5,266,988 | 11/1993 | Washisu | 396/55 |
| 5,398,132 | 3/1995 | Otani | 359/557 |
| 5,526,192 | 6/1996 | Imura et al. | 359/554 |
| 5,602,675 | 2/1997 | Okada | 359/554 |
| 5,619,735 | 4/1997 | Kai | 396/55 |

*Primary Examiner*—Thong Nguyen

[57] ABSTRACT

An image vibration reduction device has a vibration reduction optical system movable for reducing an image vibration, a guide member for movably guiding the vibration reduction optical system in a predetermined direction, and a driving force generating device for generating a driving force for moving the optical system. Disposed on substantially the same plane are a centroid of the whole movable portion including the vibration reduction optical system moved when reducing the vibration, a portion where a load is produced between the movable portion and the guide member, and a position where the driving force of the driving force generating device is generated. A moment produced due to a disposition positional deviation can be thereby restrained.

7 Claims, 8 Drawing Sheets

IMAGE VIBRATION REDUCTION DEVICE

BACKGROUND OF THE INVENTION

1. Field of the Invention

The present invention relates to an image vibration reduction device for reducing an image vibration of an object image in an optical apparatus such as a camera, a telescope and a video camera.

2. Related Background Art

An image vibration reduction device reduces a deflection of an optical axis with respect to a photographing screen by moving an image vibration reduction optical system incorporated as a whole or a part of a photographic optical system of an optical apparatus such as a camera, a telescope and a video camera, in such a direction as to offset a vibration of a camera shake caused by a photographer.

Figure 9:
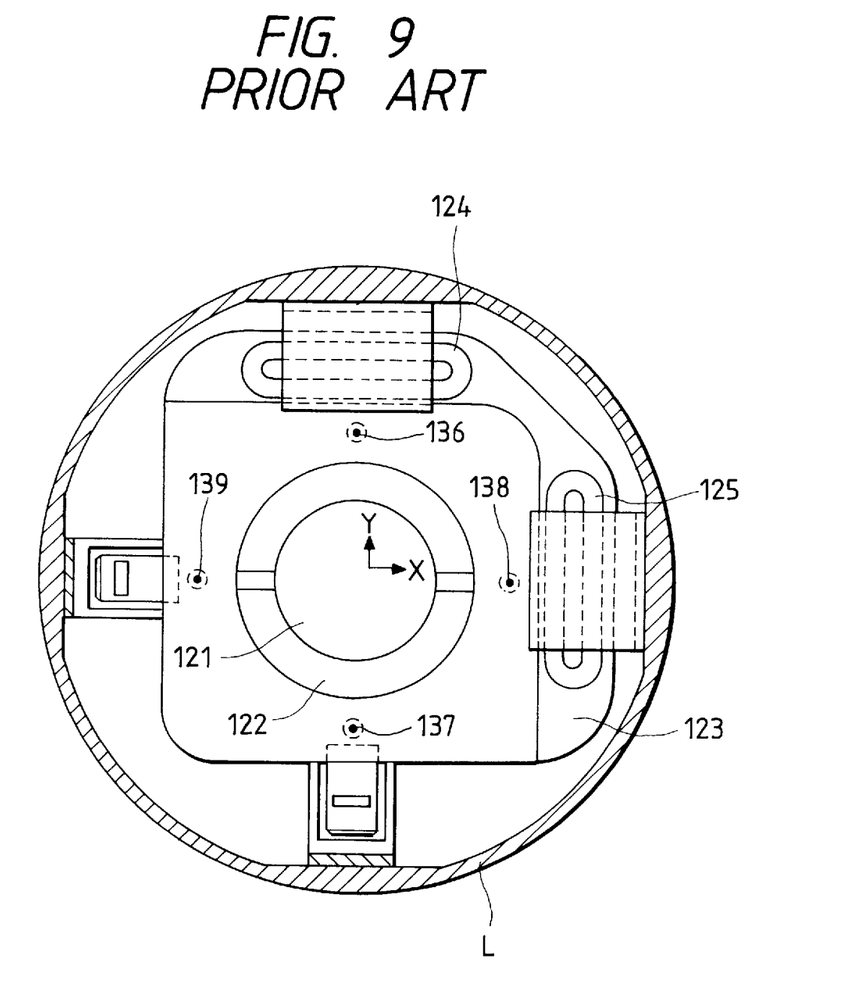
FIG. 9 is an explanatory view showing a structure of the prior art image vibration reduction device incorporated into the camera.
Figure 10:
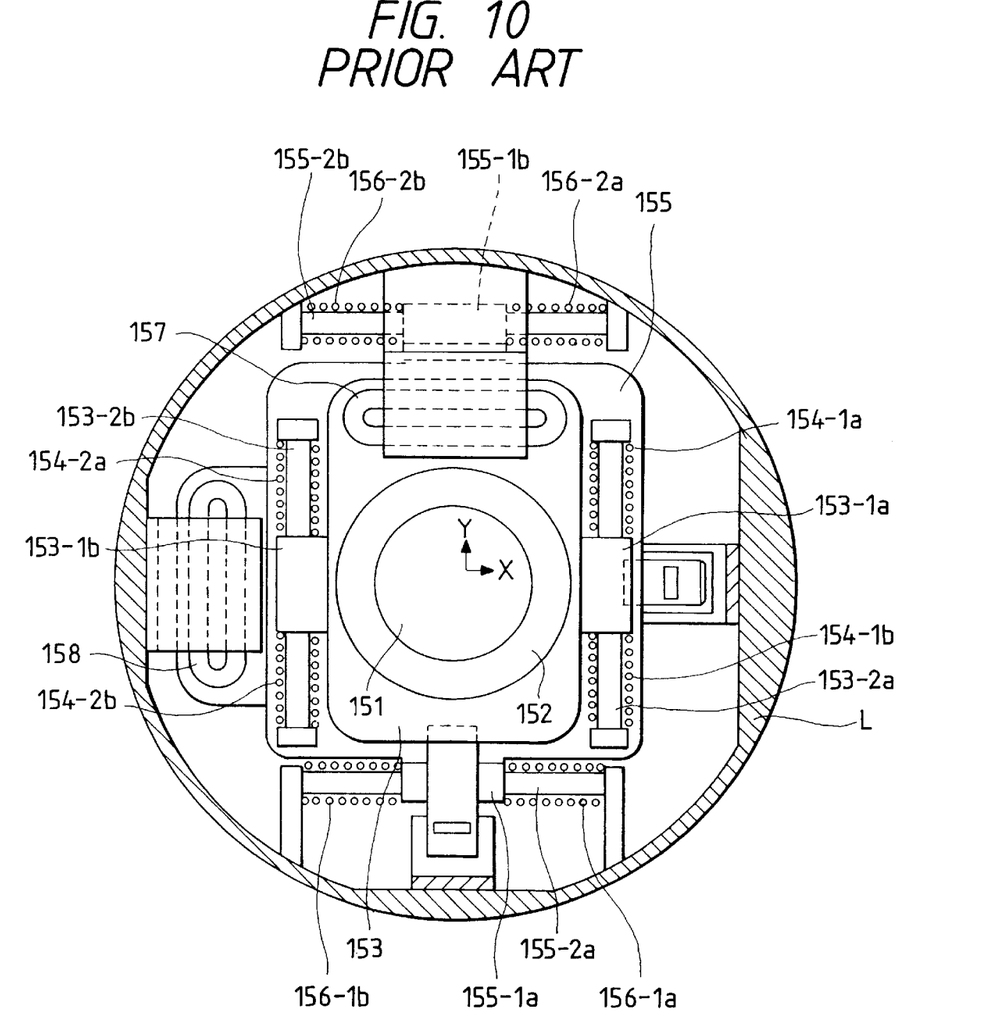
FIG. 10 is an explanatory view showing a structure of the prior art image vibration reduction device incorporated into the camera.

FIGS. 9 and 10 are explanatory views each showing a structure of a prior art image vibration reduction device incorporated into the camera.

In an example shown in FIG. 9, in an interior of a lens barrel unit L, a lens holder 122 for holding an image vibration reduction lens 121 and a lens frame 123 for supporting the lens holder 122 are so disposed as to be movable in two-dimensional directions, i.e., X- and Y-directions within the plane orthogonal to an optical axis. The lens frame 123 of an image vibration reduction optical system is supported by wires 136, 137, 138, 139 provided in parallel to the optical axis and composed of resilient members, which are fixed to four positions of the lens frame 123.

Upper and right sides of the lens frame 123 are formed with a coil support frame of a voice coil motor, and coils 124, 125 of the voice coil motor are fixed to the lens frame 123, thus constituting the voice coil motor. The lens frame 123 is driven by this voice coil motor, thereby moving the above-mentioned image vibration reduction optical system.

On the other hand, also in an example shown in FIG. 10, in the interior of the lens barrel unit L, a lens holder 152 for holding an image vibration reduction lens 151 is movable in two-dimensional directions, i.e., X- and Y-directions within the plane orthogonal to the optical axis. A Y-directional stage 153 and an X-directional stage 155 that constitute the image vibration reduction optical system are supported by guide portions 153-1a, 153-1b, 155-1a, 155-1b, shafts 153-2a, 153-2b, 155-2a, 155-2b, and coil springs 154-1a, 154-1b, 154-2a, 154-2b, 156-1a, 156-1b, 156-2a, 156-2b.

An upper side of the Y-directional stage 153 is formed with a coil support frame of a voice coil motor, and a coil 157 of the voice coil motor is fixed to the coil support frame of the voice coil motor, thus constituting the voice coil motor. Similarly, a left side of the X-directional stage 155 is formed with a coil support frame of the voice coil motor, and a coil 158 of the voice coil motor is fixed to the coil support frame of the voice coil motor, thus constituting the coil voice motor. The Y- and X-directional stages 153, 155 are driven by these voice coil motors, thereby moving the above-described image vibration reduction optical system.

By the way, if a centrobaric position of the movable portion moved by the voice coil motor, a portion where a load between a guide device and the movable portion is produced, and a portion where a driving force of the voice coil motor is produced, exist in positions spaced far from each other, it follows that a moment is caused with the movement. If this moment has a small value, there might be no problem. In the case of a large value, however, a problem may arise.

For example, in the image vibration reduction device having a structure illustrated in FIG. 9, when an image vibration reduction lens 121 is moved at a high speed, the wires 136, 137, 138, 139 are buckled and deformed due to the moment described above and therefore do not function as the resilient members.

Further, in the image vibration reduction device having a structure illustrated in FIG. 10, when the image vibration reduction lens 121 is moved at the high speed, the guide portions 153-1a, 153-1b, 155-1a, 155-1b and the shafts 153-2a, 153-2b, 155-2a, 155-2b are inclined and contact each other, with the result that relative motions between the guide portions and the shaft are hindered by frictions therebetween. Also, such an increase in the moment leads to an increment in terms of a frictional load between the guide portion and the shaft. As a result, a rise in electric power consumed is brought about.

Accordingly, under such circumstance, it is quite difficult to reduce the vibration by moving the image vibration reduction lens to a desired position, resulting in a such problem that the image vibration can not be reduced.

SUMMARY OF THE INVENTION

According to a first aspect of the present invention, an image vibration reduction device comprises a vibration reduction optical system for reducing an image vibration, a guide structure for guiding the vibration reduction optical system in a predetermined direction, and a driving force generating device for generating a driving force for moving the optical system. A centroid of the movable portion moved for reducing the vibration, a portion where a load is produced between the movable portion and the guide device, and a driving force of the driving force generating device, are disposed within the same plane or substantially the same plane.

According to a second aspect of the present invention, in the image vibration reduction device, preferably the driving force generating device is a voice coil motor composed of a coil and a permanent magnet. The image vibration reduction device has a frame body, for supporting the vibration reduction optical system, to which the coil or the permanent magnet is fixed. Disposed within the same plane or within substantially the same plane are a centrobaric position of the whole consisting of the vibration reduction optical system, the frame body and the coil or the permanent magnet, a portion where a load is produced between the movable portion and the guide structure, and a portion where a driving force of the voice coil motor is generated.

According to a third aspect of the present invention, in the image vibration reduction device, more preferably, the guide structure is constructed of a direction determining portion extending in a predetermined direction, and a follower engaging with the direction determining portion. A distance in an optical-axis direction between the guide structure and a centrobaric position of the whole, is not longer than a length of the engagement between the direction determining portion and the follower.

According to a fourth aspect of the present invention, in the image vibration reduction device, preferably, the guide structure is constructed of a direction determining portion extending in a predetermined direction, and a follower engaging with the direction determining portion. A distance in an optical-axis direction between the guide structure and the driving force generating portion, is not longer than a length of the engagement between the direction determining portion and the follower.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

First Embodiment

A first embodiment of the present invention will hereinafter be described in detail with reference to the accompanying drawings.

Figure 1:
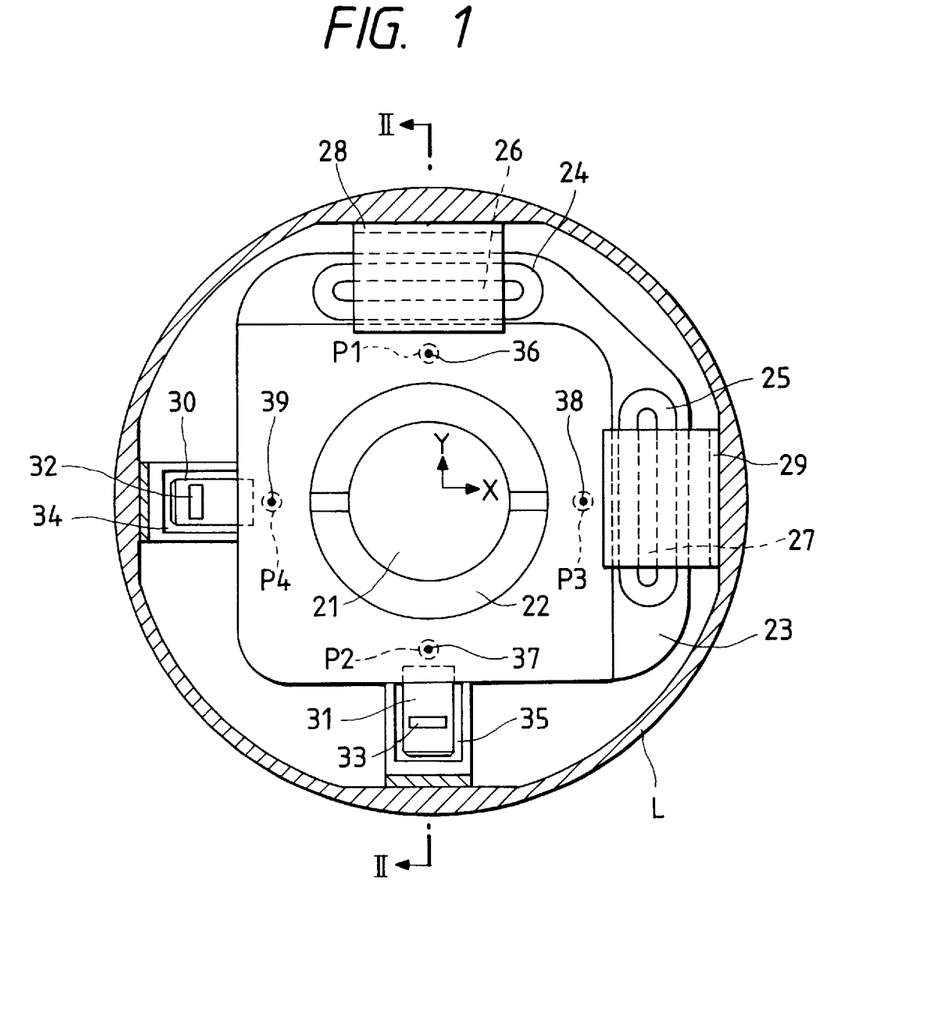
FIG. 1 is a front view illustrating a lens unit of a camera incorporating an image vibration reduction device according to the present invention.
Figure 2:
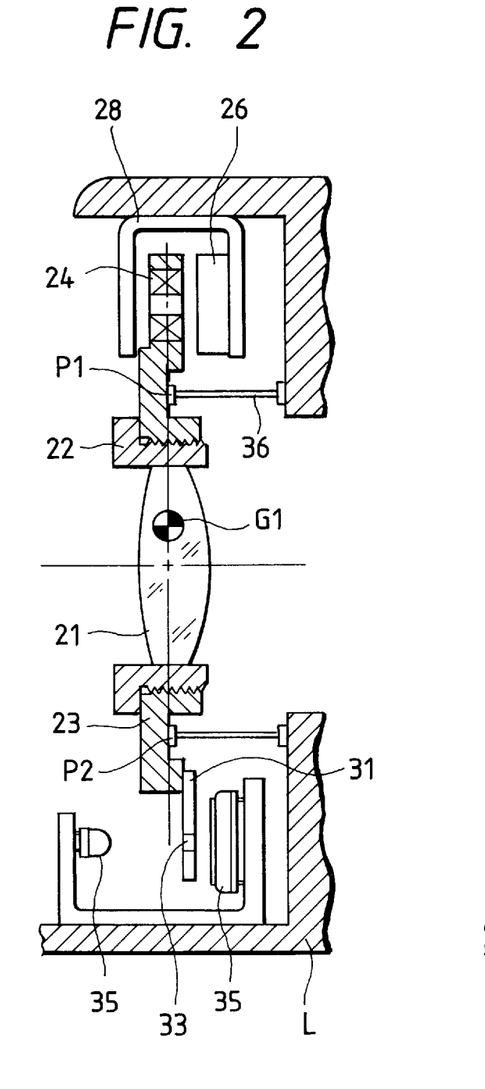
FIG. 2 is a sectional view taken along section line II—II in FIG. 1.
Figure 8:
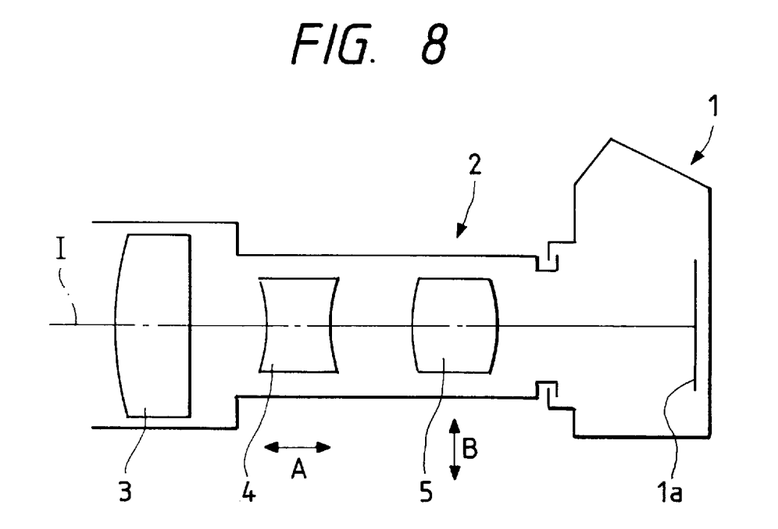
FIG. 8 is a sectional view schematically illustrating a construction of the whole camera incorporating the image vibration reduction device of the present invention.

FIG. 8 is a sectional view schematically illustrating a construction of a whole camera incorporating an image vibration reduction device according to the present invention. FIG. 1 is a front view showing a lens unit of the camera incorporating the image vibration reduction device of the present invention. FIG. 2 is a sectional view taken along the line II—II in FIG. 1. Further, FIG. 3 is a sectional view taken along section II—II line of FIG. 1, illustrating the lens unit of the camera incorporating a prior art image vibration reduction device.

Referring to FIG. 8, a lens group 2 is mounted in a camera 1. The lens group 2 is constructed of a first lens unit 3, and a second lens unit 4 for adjusting a focus in order to form an image of an object on an image surface 1a by a movement in the same direction (arrowed direction A) as an optical-axis direction I. The lens group 2 is further constructed of a third lens unit 5, including an image vibration reduction lens drive portion, for reducing an image vibration on the image surface 1a by a movement in a direction (arrowed direction B) orthogonal to the optical-axis direction I.

Figure 3:
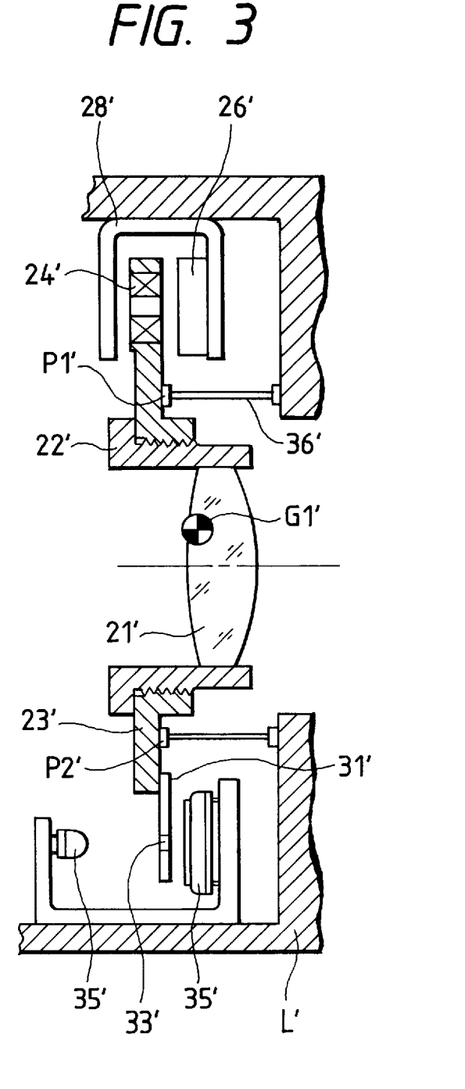
FIG. 3 is a sectional view taken along section line II—II FIG. 1, showing a lens unit of a camera incorporating a prior art image vibration reduction device.

Given next with reference to FIGS. 1–3 is a detailed explanation of a structure of the image vibration reduction lens driving portion for moving the third lens unit 5.

Referring to FIGS. 1 and 2, an image vibration reduction lens 21 moves two-dimensionally in X- and Y-directions on a plane orthogonal to the optical axis I.

The image vibration reduction lens 21 is held by a lens holder 22 which is held by a lens frame 23 taking substantially a square shape.

The right and upper sides of the lens frame 23 are formed as extended portions extending outward. These extended portions are fitted with coils 24, 25 wound with wires of thin and elongate conductors in a multiplicity of layers.

Each of the coils 24, 25 comprises two rectilinear portions parallel to each other and two circular arc portions that connect the rectilinear portions. Further, magnets 26, 27 and yokes 28, 29 are attached to a lens body so that the rectilinear portions of the coils are interposed therebetween in an optical-axis direction.

Each of the coils 26, 27 is provided with a driving circuit (not shown) for regulating an electric current supplied from a power supply under a command given from a CPU (unillustrated), whereby desired currents are allowed to flow across the coils 26, 27. Accordingly, when the currents flow across the coils 26, 27, electromagnetic forces are produced by interaction between magnetic fields and the currents. The electromagnetic force is determined by directions of the current and of the magnetic field and is produced in a direction orthogonal to the optical axis. Further, a force produced is determined by magnitudes of the current and of the magnetic field. That is, driving portions therefor constitute voice coil motors (VCMs) and function as actuators for the image vibration reduction device. A direction of a force generated by the coil 24, the magnet 26 and the yoke 28 is set in a direction Y shown in FIG. 1. A direction of a force generated by the coil 25, the magnet 27 and the yoke 28 is set in a direction X shown in FIG. 1.

Moreover, the lens frame 23 is secured to the lens body L by a plurality of resilient wires (four lengths of wires 36–39 in FIG. 1). Further, the wires 36–39 are fixed as fixed ends to the lens frame 23 and the lens body L, respectively. Loads caused by resilient forces of the wires 36–39 toward the lens frame 23 act upon fixed ends P1–P4, respectively.

Those wires 36–39 are secured in a direction substantially parallel to the optical axis I and have substantially the same length. Hence, even when the lens holder 22 is moved in the direction orthogonal to the optical axis I, the lens frame 23 is not inclined at all. Further, with this arrangement, the lens holder 22 can be moved either in the Y-direction or in the X-direction or in on-plane two-dimensional directions orthogonal to the optical axis I.

Thus, the image vibration reduction lens 21 can be moved in the direction opposite to the vibrating direction so as to offset motions caused by the camera vibrations detected from detection outputs of a vibration detection sensor (not shown) by making use of the above-mentioned electromagnetic forces.

Moreover, the device is constructed so that motions of the lens frame 23 can be detected by photo interrupters 34, 35 attached to the lens body L. Photo interrupters 34, 35 include light emitting portions and light receiving portions for detecting a moving quantity in the rectilinear direction slits 32, 33 formed in lens position detecting portions 30, 31 fitted to the lens frame 23 are interposed between the emitting portions and light receiving portions. A position of the image vibration reduction lens 21 that is detected by the photo interrupters 34, 35 is fed back to the CPU, whereby the lens 21 can be controlled to a desired position.

Herein, referring to FIG. 2, let m be a sum of the masses of the image vibration reduction lens 21, the lens holder 22, the lens frame 23 and the coils 24, 25 (unillustrated), and let G1 be the centrobaric position.

Further, referring to FIG. 3, let m' be a sum of masses of an image vibration reduction lens 21', a lens holder 22', a lens frame 23' and coils 24', 25' (unillustrated), and let G1' be the centrobaric position.

Disposed in FIG. 2 so as to exist on substantially the same plane substantially perpendicular to the optical axis are the coils 24, 25 (that is, the plane parallel to a driving force generating direction and including the center of the coil body in the optical-axis direction), the fixed ends P1, P2 (fixed ends P3, P4 are not illustrated) of the resilient wires 36, 37 (wires 38, 39 are not shown), and the centrobaric position G1.

On the other hand, referring to FIG. 3, the coils 24', 25' (similarly to FIG. 2, the plane parallel to the driving force generating direction and including the center of the coil body in the optical-axis direction), the fixed ends P1', P2' (fixed ends P3', P4' are not illustrated) of the resilient wires 36', 37' (wires 38', 39' are not shown), and the centrobaric position G1', are not disposed on substantially the same plane substantially perpendicular to the optical axis.

Therefore, referring to FIG. 3, it follows that a moment, due to a deviation (hereinafter termed "disposition positional deviation") from the plane, substantially perpendicular to the optical axis, including the coils 24', 25', the centrobaric position G1' and the fixed ends P1'–P4', acts upon the respective fixed ends P1'–P4'.

Hence the loads on the wires 36'–39' may increase enough to cause the respective wires to buckle or deform, resulting in a functional incapability of the image vibration reduction device. Certain mechanical strengths of the wires 36'–39' and the fixed ends P1'–P4' are required to prevent the above-mentioned drawback. This brings about a rise in costs for parts and an increase in manufacturing costs due to the need for more complicated mechanisms and intricacy in terms of assembling works.

Further, the behavior resulting from the moment caused by the above disposition positional deviation and the high setting of a spring constant necessary to provide the wires 36'–39' with the mechanical strengths, become loads when the image vibration reduction lens is moved to the predetermined position by the electromagnetic force of the voice coil motor. This added load increases the electricity to be consumed and is a burden upon the control.

In this respect, as shown in FIG. 2, if the fixed ends P1–P4, the coils 24, 25 and the centrobaric position G1 are disposed on substantially the same plane and are substantially perpendicular to the optical axis I, it is feasible to restrain the moment acting upon the respective fixed ends P1–P4 due to the above-described disposition positional deviation.

Hence, as compared with the case where the centrobaric position G1', the fixed ends P1'–P4' and the coils 24', 25' are not disposed on substantially the same plane substantially perpendicular to the optical axis I, the image vibration reduction device functions in a more formal fashion. Besides, the loads are reduced by moving the image vibration reduction lens to the desired position using the electromagnetic force of the voice coil motor, and it is also possible to save the electricity consumed and decrease the burden on the control.

Thus, it is feasible to prevent an unstable behavior of the movable portion by obviating the increment in the moment of the image vibration reduction device in accordance with the first embodiment. Accordingly, the image vibration can be reduced by moving the image vibration reduction device to the desired position. The image vibration can be thus surely reduced.

Note that the effect of the present invention remains unchanged even when the whole device is rotated about the optical axis I.

Second Embodiment

A second embodiment of the present invention will be discussed with reference to the accompanying drawings. Note that only constructions different from the first embodiment will be explained in the following discussion of subsequent embodiments, and the explanations of the same constructive elements are omitted by marking them with the like numerals.

Figure 4:
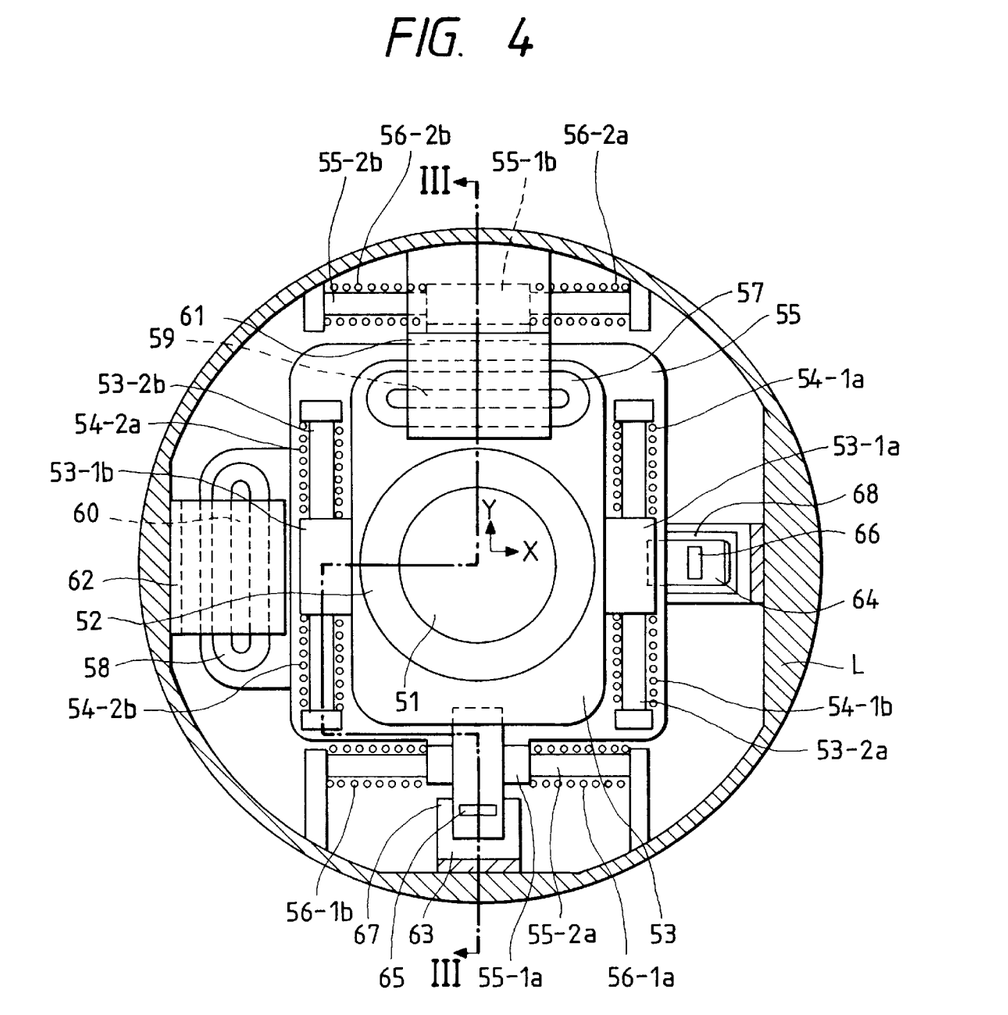
FIG. 4 is a front view illustrating the lens unit of the camera incorporating the image vibration reduction device of the present invention.
Figure 5:
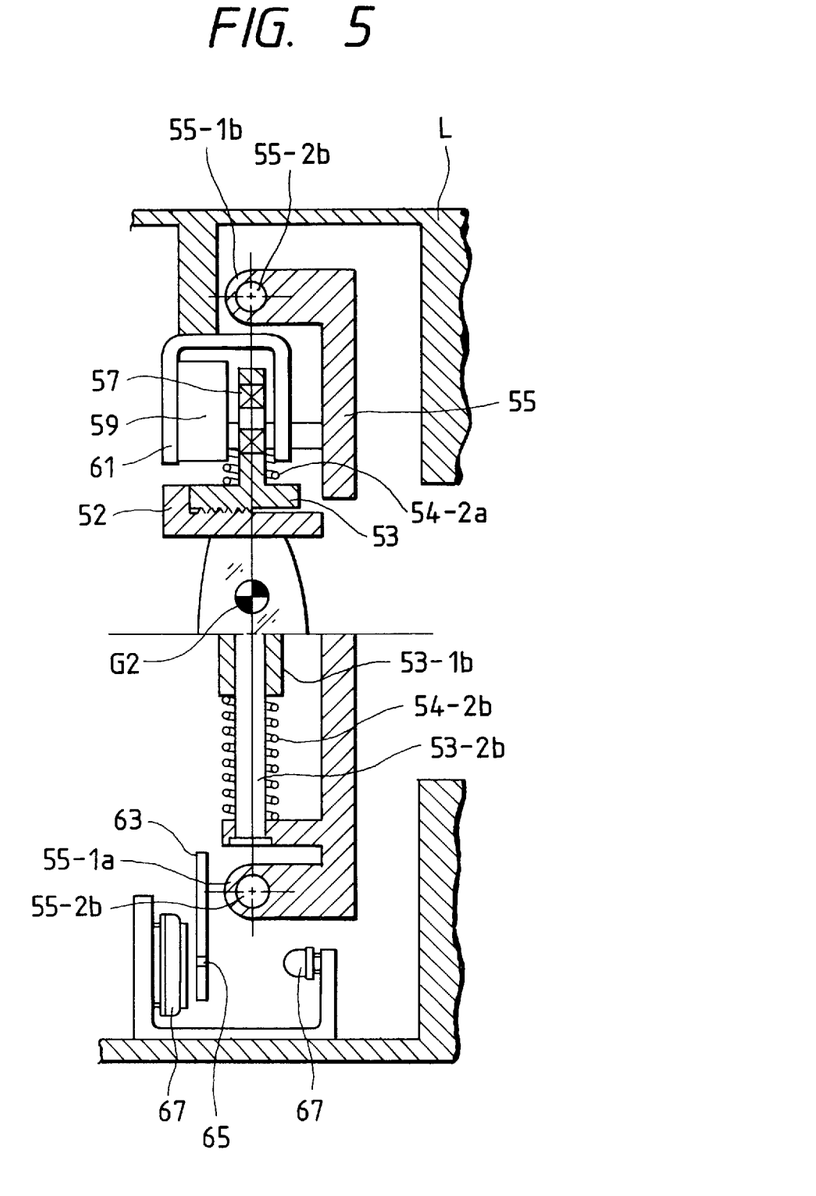
FIG. 5 is a sectional view taken along section line III—III in FIG. 4.

FIG. 4 is a front view illustrating the lens unit of the camera incorporating the image vibration reduction device of the present invention. FIG. 5 is a sectional view taken along section line III—III in FIG. 4. Further, FIG. 6 is a sectional view taken along section line III—III of FIG. 4, showing the lens unit of the camera incorporating the prior art image vibration reduction device.

Figure 6:
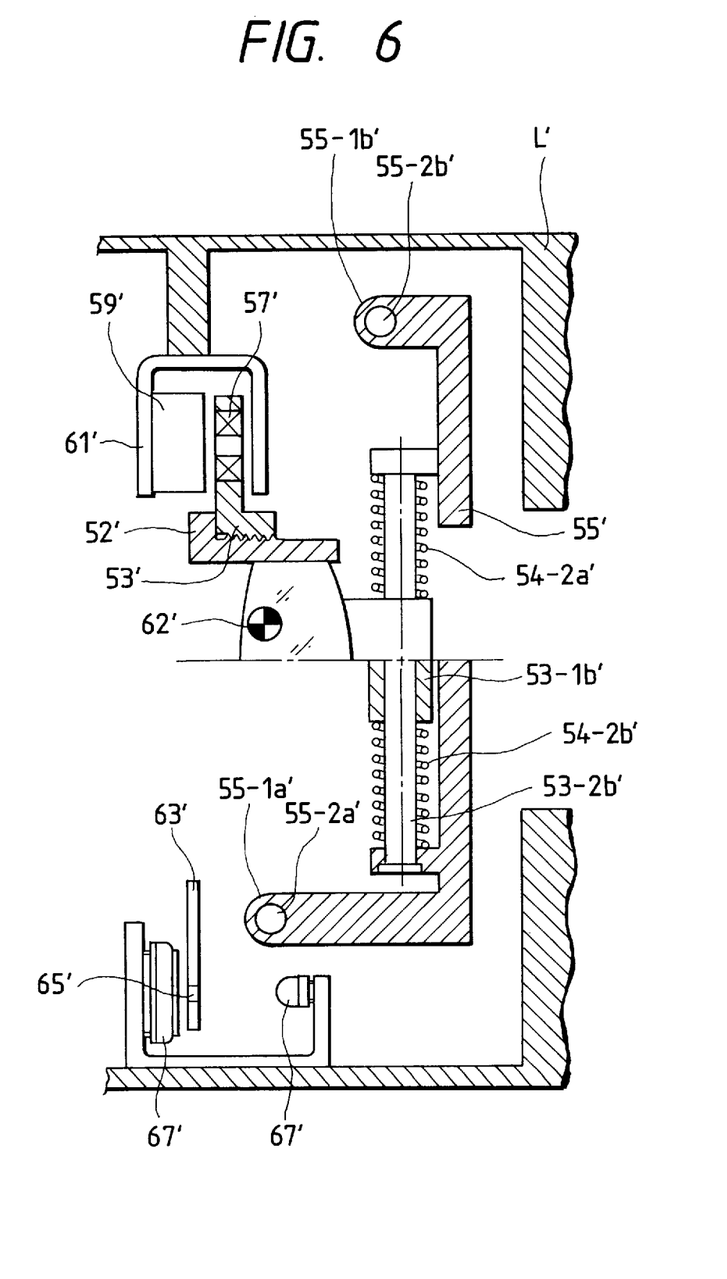
FIG. 6 is a sectional view taken along section line III—III in FIG. 4, illustrating the lens unit of the camera incorporating the prior art image vibration reduction device.

In the second embodiment, the camera having the above-described structure shown in FIG. 1 incorporates the image vibration reduction device shown in FIGS. 4–6.

Referring to FIGS. 4–6, a lens holder 52 holds an image vibration reduction lens 51.

A Y-directional stage 53 moves the image vibration reduction lens 51 in only the Y-direction shown in FIG. 4 by an engagement member consisting of guide portions 53-1a, 53-1b and Y-directional shafts 53-2a, 53-2b.

Both ends of coil springs 54-1a, 54-1b, 54-2a, 54-2b are, as illustrated in FIG. 4, fixed to an X-directional stage 55 and Y-directional stage guide portions 53-1a, 53-1b that will be mentioned later. On the other hand, the Y-directional shaft 53-2a is inserted into the coil springs 54-1a, 54-1b, and the Y-directional shaft 53-2b is inserted into the coil springs 54-2a, 54-2b. Besides, the respective shafts are fixedly supported on the X-directional stage 55, and therefore the Y-directional stage 53 is so resiliently supported as to be movable in only the Y-direction with respect to the X-directional stage 55.

Note that the guide portions 53-1a, 53-1b are constructed integrally with the Y-directional stage 53 in the second embodiment.

X-directional stage 55 fixedly supports the Y-directional shafts 53-2a, 53-2b and holds the Y-directional stage 53 through the Y-directional shafts 53-2a, 53-2b and the guide portions 53-1a, 53-1b X-directional stage 55 is movable in only the X-direction shown in FIG. 4 by an engagement member consisting of X-directional shafts 55-2a, 55-2b and guide portions 55-1a, 55-1b.

Both ends of coil springs 56-1a, 56-1b, 56-2a, 56-2b are, as illustrated in FIG. 4, fixed to the lens body L and the X-directional stage guide portion 55-1a or 55-1b. The X-directional shaft 55-2a is inserted into the coil springs 56-1a, 56-1b, and the X-directional shaft 55-2b is inserted into the coil springs 56-2a, 56-2b. Besides, the respective shafts are fixedly supported on the lens body L, and therefore the X-directional stage 55 is so resiliently supported as to be movable in only X-direction with respect to the lens body L.

Note that the guide portions 55-1a, 55-1b are integrally with the X-directional stage 55 in this embodiment.

Further, a coil 57 is secured to the Y-directional stage 53 and wound with wires of thin and elongate conductors in a multiplicity of layers. A coil 58 is secured to the X-directional stage 55 and wound with wires of thin and elongate conductors in a multiplicity of layers.

These coils 57, 58 comprise two sets of rectilinear portions and two sets of circular arc portions. Further, there are provided magnets 59, 60 and yokes 61, 62 that are attached to the lens body L so that the rectilinear portions of the coils 57, 58 are interposed therebetween in the optical-axis direction. Each of the coils 57, 58 is provided with a driving circuit (not shown) for regulating the electric current supplied from the power supply under the command given from the CPU (unillustrated), whereby desired currents are allowed to flow across the coils 57, 58. Accordingly, when the currents flow across the coils 57, 58, the electromagnetic forces are produced by the magnetic fields and the currents.

Also, the electromagnetic force is determined by directions of the current and of the magnetic field and is produced in the direction orthogonal to the optical axis in FIG. 4. Further, the force produced is determined by magnitudes of the current and of the magnetic field. That is, driving portions therefor constitute voice coil motors (VCMs) and function as actuators for the image vibration reduction device.

A direction of a force generated by the coil 57, the magnet 59 and the yoke 61 is set in a direction Y shown in FIG. 4. A direction of a force generated by the coil 58, the magnet 60 and the yoke 62 is set in a direction X shown in FIG. 4.

The lens holder 52 can be thereby moved either in the Y-direction or in the X-direction in FIG. 4 and also in an on-plane arbitrary direction orthogonal to the optical axis I.

Thus, the image vibration reduction lens can be moved in an arbitrary direction so as to offset the motion of the camera that is obtained from an output of a vibration detecting sensor (unillustrated) by making use of the above-mentioned electromagnetic force.

Further, the movement of the Y-directional stage 53 can be detected by a photo interrupter 67 attached to the lens body L and consisting of a light emitting portion and a light receiving portion for detecting a moving quantity in the rectilinear direction so that a slit 65 is formed in a lens position detecting portion 63 fitted to the Y-directional stage 53.

Similarly, the movement of the X-directional stage 55 can be detected by a photo interrupter 68 attached to the lens body L and consisting of a light emitting portion and a light receiving portion for detecting a moving quantity in the rectilinear direction so that a slit 66 is formed in a lens position detecting portion 64 fitted to the X-directional stage 55.

The position of the image vibration reduction lens 51 that is thereby obtained is fed back to the CPU, whereby the lens 51 can be controlled to a desired position.

In the thus constructed image vibration reduction device shown in FIG. 5, let m be a sum of masses of the image vibration reduction lens 51, the lens holder 52, the Y-directional stage 53, the X-directional stage 55 and the coils 57, 58 (unillustrated), and let G2 be the centrobaric position.

On the other hand, let m' be a sum of masses of an image vibration reduction lens 51', a lens holder 52', a Y-directional stage 53', an X-directional stage 55' and coils 57', 58' (unillustrated), and let G1' be the centrobaric position thereof.

Disposed in FIG. 5 so as to exist on substantially the same plane substantially perpendicular to the optical axis are Y-directional shafts 53-2a (not shown), 53-2b, X-directional shafts 55-2a, 55-2b, central axes thereof, the coils 57, 58 (that is, the plane parallel to a driving force generating direction and including the center of the coil body in the optical-axis direction), and the centrobaric position G2.

On the other hand, referring to FIG. 6, Y-directional shafts 53-2a' (unillustrated), 53-2b', X-directional shafts 55-2a', 55-2b', central axes thereof, coils 57', 58' (similarly to FIG. 5, the plane parallel to the driving force generating direction and including the center of the coil body in the optical-axis direction) and the centrobaric position G2', are not disposed on substantially the same plane substantially perpendicular to the optical axis.

Referring to FIG. 6, each of the central axes of the centrobaric position G2', the coils 57', 58', the Y-directional shafts 53-2a', 53-2b' and X-directional shafts 55-2a', 55-2b' is not disposed on substantially the same plane substantially perpendicular to the optical axis, and therefore it follows that there is produced a moment due to the disposition positional deviation from the plane, substantially perpendicular to the optical axis, including the coils 57', 58', the centrobaric position G2' and the central axes of the respective shafts.

Figure 7:
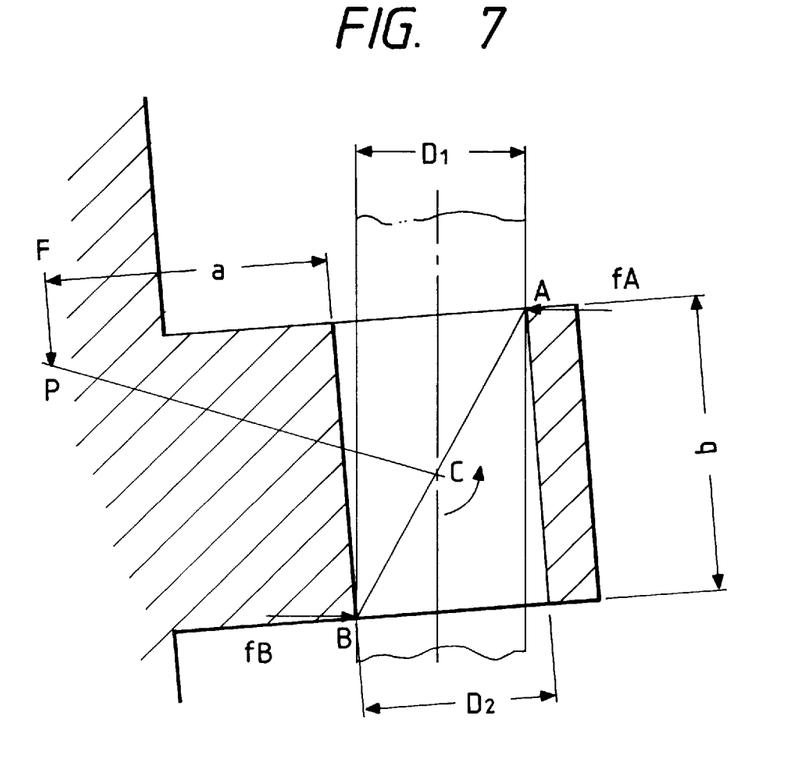
FIG. 7 is a schematic diagram showing how a moment is produced due to a disposition positional deviation from a plane substantially perpendicular to an optical axis, including a centrobaric position and each shaft central axis of a coil.

FIG. 7 illustrates how a moment is produced, due to a disposition positional deviation from a plane substantially perpendicular to an optical axis, in the image reduction vibration device of FIG. 4. As illustrated in FIG. 7, it is assumed that F is the force becoming the moment produced due to the disposition positional deviation, P is the point at which the force F acts, fA is the force by which the guide portion presses the shaft in the horizontal direction with the force F at the point A in FIG. 7, fB is the force by which the guide portion presses the shaft in the horizontal direction with the force F at the point B in FIG. 7, C is the middle point of a straight line AB, a is the distance from the point P to a hole of the shaft guide portion through which the shaft passes, b is the length of the shaft guide portion, D1 is the diameter of the shaft, and D2 is the diameter of the hole of the shaft guide through which the shaft passes. Then, the shaft guide portion does not move with respect to the shaft when the following condition is satisfied:

$$F \leq \mu(fA+fB) \tag{1}$$

where $\mu$ is the frictional coefficient.

Herein, as a matter of fact, the shaft diameter and the hole diameter of the shaft guide portion through which the shaft passes are substantially equal, and hence D1=D2=D. A moment about the point C with the force F is equal to a moment based on a couple of the force fA and the force fB, so the following formula (2) is satisfied:

$$F(a+D/2)=fA \cdot b/2+fB \cdot b/2 \tag{2}$$

From the formulas (1) and (2), the formula (3) below is derived.

$$b/2 \cdot 1/\mu - D/2 \leq a \tag{3}$$

When b=20, D=2, and $\mu$=0.45, the formula (3) is:

$$a \geq 21.2 \tag{4}$$

If the value a satisfies the formula (4), the shaft guide portion will not move relative to the shaft.

The lower limit of the value a is nearly equal to the value b, and hence a condition for enabling the stage to smoothly move with the aid of the shaft and the shaft guide portion by eliminating a working error, is a≦b. Namely, it is required for the normal operation that the driving force generating position and the centrobaric position be within the distance shorter than b from the hole of the shaft guide portion.

More specifically, if the above condition is not satisfied, with the moment due to the disposition positional deviation described above, the loads act between the Y-directional shafts 53-2a', 53-2b' and the guide portions 53-1a', 53-1b', and between the X-directional shafts 55-2a', 55-2b' and the guide portions 55-1a', 55-1b'. Depending on a moving velocity of the image vibration reduction lens 51 and an attitude or orientation of the lens body L, the shaft and the shaft guide portion are inclined and contact each other. With frictions therebetween, relative motions between the shaft and the guide portion are hindered, with the result that the image vibration reduction device does not function as it does.

Further, even if the load is enough to hinder the relative motion between the shaft and the shaft guide portion is not applied, this load becomes, it can be considered, a load when the image vibration reduction lens is moved to a predetermined position by the electromagnetic force of the voice coil motor. This brings about an increment in the current consumed.

However, as illustrated in FIG. 5, when taking such a structure that the respective central axes of the Y-directional shafts 53-2a, 53-2b, the X-directional shafts 55-2a, 55-2b, and the centrobaric position G2 that are shown according to the present invention, are disposed on substantially the same plane substantially perpendicular to the optical axis I, the moment produced by the above-mentioned disposition positional deviation can be restrained.

For smoothly moving the image vibration reduction lens by decreasing the load, the distance may be set such as a=(½)b.

Also, for decreasing by far the larger amount of load, as explained with reference to FIG. 7, preferably, a+(½)D=0.

Hence, as compared with such an arrangement that the centrobaric position G2', the coils 57', 58' and the respective central axes of the Y-directional shafts 53-2a', 53-2b' and the X-directional shafts 55-2a', 55-2b' are not disposed on substantially the same plane substantially perpendicular to the optical axis I, a failure caused by the contact frictions between the shaft and the shaft guide portion can be restrained. Further, when the image vibration reduction lens is moved to the predetermined position by the electromagnetic force of the voice coil motor, the load can be decreased.

Note that the effect of the present invention remains unchanged even when the whole device is rotated about the optical axis I.

Thus, in accordance with this embodiment, it is possible to prevent the unstable behavior of the movable portion by obviating the increment in the moment of the image vibration reduction device.

Accordingly, in such a state, the image vibration can be reduced by moving the image vibration reduction lens to the desired position. The image vibration can be reduced.

It is apparent that, in this invention, a wide range of different working modes can be formed based on the invention without deviating from the spirit and scope of the invention. This invention is not restricted by its specific working modes except being limited by the appended claims.

What is claimed is:

1. An image vibration reduction device, comprising:
   a vibration reduction optical system, having a movable portion and a centroid, to reduce an image vibration;
   a guide structure to guide said vibration reduction optical system in a predetermined direction; and
   a driving force generating device to generate a driving force to move said vibration reduction optical system,
   wherein a load is produced at a load portion between the moveable portion and said guide structure, and wherein the centroid of said vibration reduction optical system, the load portion, and a position of the generated driving force of said driving force generating device, are on substantially the same plane.

2. An image vibration reduction device according to claim 1, further comprising a frame body to support said vibration reduction optical system, wherein said driving force generating device is a voice coil motor that has a coil and a permanent magnet,
   and wherein one of said coil and said permanent magnet is fixed to said frame body, and
   said movable portion of said vibration reduction optical system includes one of said coil and said permanent magnet, and said frame body.

3. An image vibration reduction device according to claim 2, said guide structure further comprising a moving direction determining portion extending in the predetermined direction, and a follower engaging at a length of engagement with said direction determining portion, wherein said vibration reduction optical system has a centrobaric position, and
   a distance between said guide structure and the centrobaric position is not longer than the length of engagement.

4. An image vibration reduction device according to claim 2, said guide structure further comprising a moving direction determining portion extending in the predetermined direction, and a follower engaging at a length of engagement with said direction determining portion, wherein
   a distance between said guide structure and said generated position is not longer than the length of engagement.

5. An image vibration reduction device, comprising:
   a vibration reduction optical system, having a movable portion and a centroid, to reduce an image vibration;
   a guide structure to guide said vibration reduction optical system in a predetermined direction, having a moving direction determining portion extending in the predetermined direction, and a follower engaging at a length of engagement with said direction determining portion;
   a frame body to support said vibration reduction optical system; and
   a voice coil motor that has a coil and a permanent magnet, to generate a driving force to move said vibration reduction optical system, wherein
   a load is produced at a load portion between the moveable portion and said guide structure, and wherein the centroid of said vibration reduction optical system, the load portion, and a position of the generated driving force of said voice coil motor, are on substantially the same plane,
   one of said coil and said permanent magnet is fixed to said frame body,
   said movable portion of said vibration reduction optical system includes one of said coil and said permanent magnet, and said frame body, and
   said vibration reduction optical system has a centrobaric position, and a distance between said guide structure and the centrobaric position is not longer than the length of engagement.

6. An image vibration reduction device according to claim 5, wherein a distance between said guide structure and said generated position is not longer than the length of engagement.

7. An image vibration reduction device, comprising:

a vibration reduction optical system, having a movable portion and a centroid, to reduce an image vibration;

a guide structure to guide said vibration reduction optical system in a predetermined direction, having a moving direction determining portion extending in the predetermined direction, and a follower engaging at a length of engagement with said direction determining portion;

a frame body to support said vibration reduction optical system; and a voice coil motor that has a coil and a permanent magnet, to generate a driving force to move said vibration reduction optical system, wherein a load is produced at a load portion between the moveable portion and said guide structure, and wherein the centroid of said vibration reduction optical system, the load portion, and a position of the generated driving force of said voice coil motor, are on substantially the same plane, one of said coil and said permanent magnet is fixed to said frame body, said movable portion of said vibration reduction optical system includes one of said coil and said permanent magnet, and said frame body, and a distance between said guide structure and said generated position is not longer than the length of engagement.

* * * * *